United States Patent [19]

Wolfe

[11] 4,103,726

[45] Aug. 1, 1978

[54] METHOD OF MAKING A TIRE AND SAID TIRE

[75] Inventor: James D. Wolfe, North Canton, Ohio

[73] Assignee: The Goodyear Tire & Rubber Company, Akron, Ohio

[21] Appl. No.: 422,640

[22] Filed: Dec. 7, 1973

[51] Int. Cl.$^2$ .............................................. B60C 1/00
[52] U.S. Cl. .................................. 152/330 R; 152/310; 152/357 A; 156/77; 428/313
[58] Field of Search .................................. 152/310–318, 152/330, 112, 113, 115, 357 A, 357 R; 156/77, 78, 110 C; 161/159–161; 260/2.5; 428/311, 313

[56] References Cited

U.S. PATENT DOCUMENTS

| | | | |
|---|---|---|---|
| 1,077,125 | 10/1913 | Doughty | 156/110 R |
| 1,115,409 | 10/1914 | Dickinson | 156/110 C |
| 1,248,713 | 12/1917 | Rand | 156/110 C |
| 3,025,200 | 3/1962 | Powers | 161/168 |
| 3,301,301 | 1/1967 | Gapen | 152/357 A |
| 3,622,435 | 11/1971 | Cacella | 161/169 |
| 3,651,014 | 3/1972 | Witsiepe | 260/45.85 R |
| 3,658,108 | 4/1972 | Marzocchi | 152/357 A |
| 3,676,173 | 7/1972 | Adams | 161/159 |
| 3,691,620 | 9/1972 | Harr | 161/159 |
| 3,701,374 | 10/1972 | McGillvary | 152/330 R |
| 3,720,574 | 3/1973 | Kunc | 161/159 |

FOREIGN PATENT DOCUMENTS

| | | | |
|---|---|---|---|
| 1,196,363 | 7/1965 | Fed. Rep. of Germany | 152/357 A |
| 1,480,939 | 3/1969 | Fed. Rep. of Germany | 152/357 A |

*Primary Examiner*—Drayton E. Hoffman
*Assistant Examiner*—Carl Rowold
*Attorney, Agent, or Firm*—J. D. Wolfe

[57] ABSTRACT

A tire having a reticulated or foraminous plastic reinforcing member within an elastomeric body. This tire can be made by reticulating polyester or nylon type plastic to give a foraminous member and then injecting a liquid elastomer or elastomer precursor into a mold to fill the interstices of the foraminous body.

3 Claims, 3 Drawing Figures

METHOD OF MAKING A TIRE AND SAID TIRE

This invention relates to a new method of making a reinforced tire and said tire. More particularly, this invention relates to a method of making an elastomeric pneumatic tire having plastic reinforcing.

For a number of years the tire designers and manufacturers have talked of making an injected molded tire, but the commercial feasibility of this concept has pointed to the fact that a fabric or other reinforcing material was needed and this need made the so-called "injected tire" more of a theoretical concept than one in the practical realm. Although the major tire manufacturers have shown their so-called "injection molded tires" the automobile manufacturers have not approved their use.

Therefore, an object of this invention is to provide a method of making an injected molded tire having reinforcing plastic network or members.

This object, as well as other objects and advantages, can be readily appreciated by reference to the drawings, wherein FIG. 1 is a side view in elevation of a reticulated foam having a toro shape and dimensions essentially equivalent to that of a tire from the bead to the tread;

Figure 1:
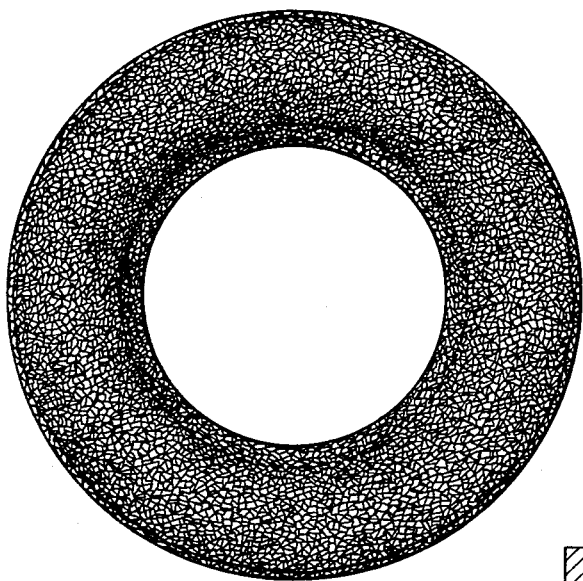
Figure 2:
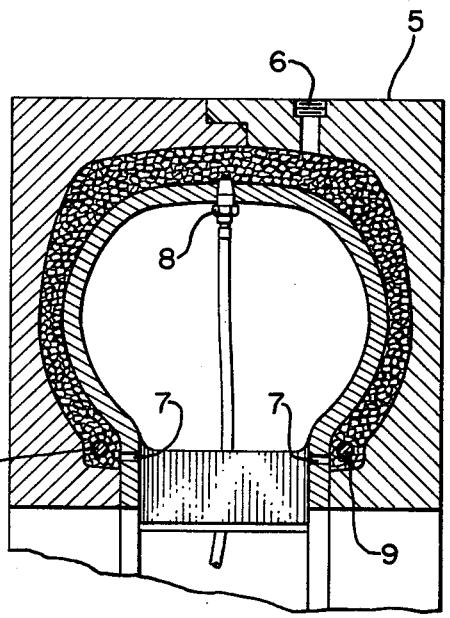
FIG. 2 is a cross section through a mold having the reticulated foam therein.
Figure 3:
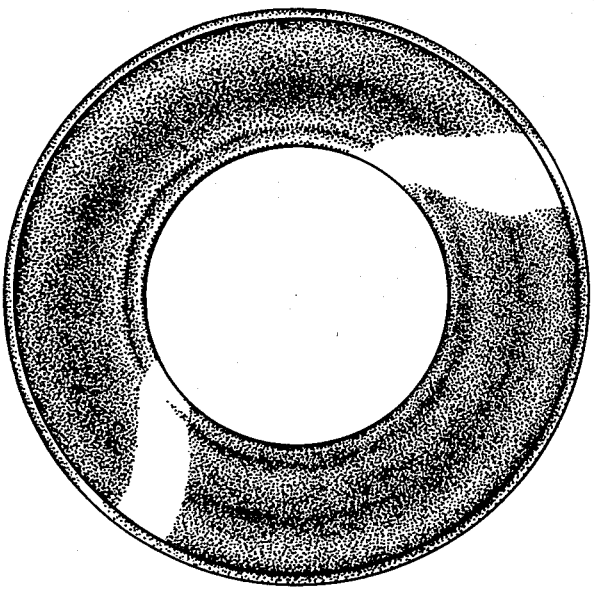
FIG. 3 is a side elevational view of the tire formed by encapsulating the reticulated foam of FIG. 1 with a suitable elastomer to give a pneumatic tire having plastic reinforcing.

Referring to FIG. 2, numeral 5 indicates a closed mold having a filling part 6 for adding the foamable material to the mold and evacuation port or ports 7. The amount of foamable material added to the mold is sufficient to at least fill the mold and preferably develops a pressure of about one to 100 pounds per square inch pressure within the mold. It is desirable that the foam be essentially open celled.

In a preferred procedure the mold is evacuated through port 7 and then filled with a combustible gaseous mixture, such as methane and air through port 6. The numeral 8 represents a spark plug screwed into the mold and having its spark gap in communication with the combustible gaseous mixture filling the tire mold. The spark plug 8 is connected with an electrical system (not shown) for causing an electric charge to arc across the spark plug and fire the combustible mixture. As the flame front of the burning combustible mixture moves through the mold the thinner cell walls of the foam will melt and effect reticulation of the foam. The reticulated foam is removed from the mold to obtain a reinforcing member having essentially the dimensions of a tire in the tread, sidewall and bead area and hereinafter referred to as a foam toro.

This retirculated foam toro is placed inside a tire mold and the mold is closed and preferably evacuated prior to injecting the elastomer or the elastomer precursor into the mold to fill the mold.

The foam toro encapulsated in melted elastomer or an elastomeric precursor is preferably heated within the mold to effect an increase in molecular weight to cause the elastomer to become essentially thermosetting in nature rather than thermoplastic type of elastomer.

The foam toro is preferably made from the tire fabric material such as polyester or polyamides. Generally the polyester or polyamide is mixed with a gas generating or blowing agent such as the tetrazoles and then placed in the toro mold and heated to gas generating or decomposing temperature of the blowing agent to cause foaming of the polyester or polyamide to fill the mold with foamed product and preferably develop a pressure greater than atmospheric pressure.

The polyethylene terephthalic ester or the ethylene propylene terephthalates of fiber grade may be mixed in powdered or finely divided form with a blowing agent 5-phenyl tetrazole in a banbury mill and then placed in the toro mold to be foamed by heating to form a foam having essentially the shape and dimensions of a tire. Alternately, an injection grade polyamide of the nylon type could be compounded with about 5 to 20 parts of the 5-phenyl tetrazole per 100 parts of nylon and be molded to give a shaped foam having the shape of a tire upon heating to in excess of 500° but less than 600° F.

The shaped foams can be made in any of the well-known ways of making foam such as flashing of a solvent or by the well-known blowing agents. Also, other fabric materials such as syndotactic polypropylene can be used as reinforcing member, too. Preferably the foams are reticulated while retained in a mold by use of a moving flame front created by firing a combustible mixture such as oxygen and propane. Where desired, the foam can have short or long fibers or filaments of glass, wire and related reinforcing materials embedded therein.

The foam toro is placed in the manner shown in FIG. 2 within a mold. Where it is desired to have wire beads present in the tire, these beads 9 preferably are placed in a toro mold and embedded in the foam at the time the foam toro is formed. This practice precisely positions the beads within the tire mold as well as in the finished tire.

With the foam toro in the mold, a vacuum of 5 to 20 pounds per square inch is drawn on the mold through ports 7. Then a liquid elastomer or elastomer precursor is injected into the tire mold through port 6.

For some tire uses a liquid polyurethane reaction mixture such as those described in U.S. Pat. No. 3,701,374 can be used or the other tire stock grade polyurethanes. After the polyurethane has reacted, set and cured, the tire can be recovered by opening the mold to permit removal of the tire.

Alternately, the liquid plasticizer dispersion of the usual synthetic or natural rubbers such as those disclosed in the French Pat. No. 1,526,075 and especially Examples A and B thereof can be fed into the mold and cured to give a molded tire having reinforcing of the polyester or polyamide type, for instance, Nylon 6, Nylon 6/6 or Nylon 11 types, or duPont's Kapon grade.

A representative embodiment of the invention is set forth hereinafter:

A mixture of E-caprolactam containing hexamethylene diisocyanate and sodium hydride is pumped into a rotating toro mold containing 5-phenyl tetrazole and rotation of the mold is continued as the temperature is raised to generate a foam. While the mold is still hot a small amount (0.1 to 5 percent by weight) of a polyphenyl polyisocyanate polymethane is injected into the toro mold to precondition the foamed nylon to bond the rubber.

The pretreated foam nylon toro is placed in an injection mold and the voids in foam are filled with a rubber oil slurry and are heated to set and cure the rubber to give a tire having a unitary network of nylon-reinforcing members.

A rubber oil slurry of 40–60 parts by weight of aliphatic or aromatic extender oil and 60–40 parts by weight of butadiene styrene rubber containing sulfur curative or related elastomers are well suited to encapsulation of the plastic toro or toroid shaped foam reinforcing member. It should be appreciated that although the reinforcing member has been referred to as a toro or toroidical foam, it can be characterized also as a celliform structure. By a celliform structure is herein meant a structure in which at least the outlines of a 3-dimensional cellular structure are present. The faces of the cells outlined may be present or may be lacking. Celliform structures wherein at least a major portion of the cell faces are present, in the form of sheets, membranes, or other obstructions to free passage in every direction betwen the cells, are herein designated cellular structures. Also, the reinforcing member can be isotropic or anisotropic, depending on the cell configuration of the foam.

Also, the thickness of the toro in the sidewall relative to the bead area can be varied to control the stiffness and the flexibility of the sidewall relative to the tread. Thinner sections in the sidewall would promote flexibility.

Furthermore, it should be appreciated that the tread design can be given to the foam toro or can be formed during encapsulation or impregnating the foam toro to form the tire.

Any of the usual elastomers and their customary curing agents can be slurried and thus be used to shape a toro reinforced tire of any of the known designs. Likewise, the cure times and pressures are well known to the tire builder.

While certain representative embodiments and details have been shown for the purpose of illustrating the invention, it will be apparent to those skilled in this art that various changes and modifications may be made therein without departing from the spirit or scope of the invention.

What is claimed is:

1. A tire, including a unitary reinforcing network filled with an elastomer, said network being a reticulated foam plastic.

2. The tire of claim 1 wherein the unitary network is a reticulated foam of polyester or polamide of at least fiber grade.

3. The tire of claim 1 wherein the plastic is open-celled foamed polyester or open-celled foamed polyamide.

* * * * *